T. REYNOLDS.
BICYCLE CRANK.
APPLICATION FILED MAR. 15, 1910.
977,900.
Patented Dec. 6, 1910.
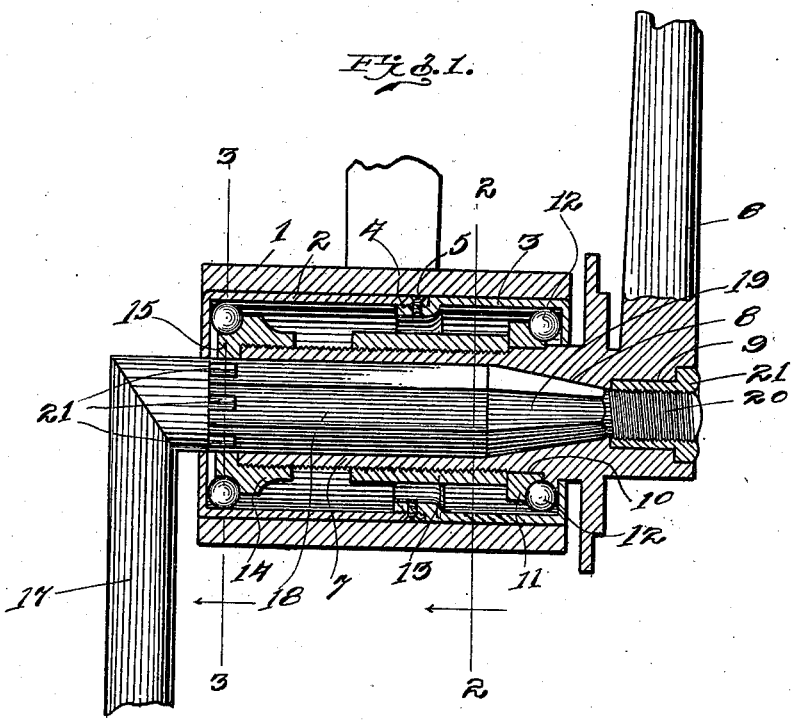
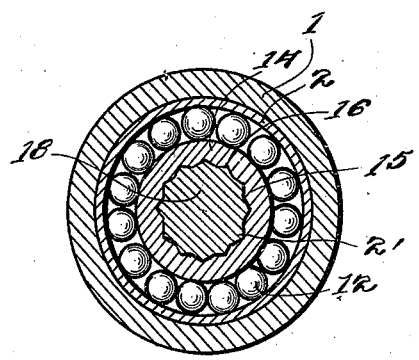
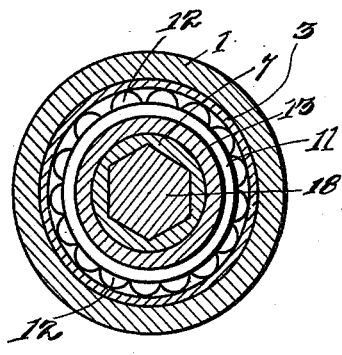
Inventor
Timothy Reynolds.
Witnesses his
UNITED STATES PATENT OFFICE.

TIMOTHY REYNOLDS, OF SELMA, CALIFORNIA.

BICYCLE-CRANK.

977,900.     Specification of Letters Patent.     Patented Dec. 6, 1910.

Application filed March 15, 1910. Serial No. 549,389.

*To all whom it may concern:*

Be it known that I, TIMOTHY REYNOLDS, a citizen of the United States of America, residing at Selma, in the county of Fresno and State of California, have invented certain new and useful Improvements in Bicycle-Cranks, of which the following is a specification, reference being had therein to the accompanying drawing.

This invention relates to cranks and crank hangers especially adapted for use in connection with bicycles, and the principal object of the same is to provide a novel type of hanger in which the parts are so arranged that dust or other foreign matter cannot gain access to the bearings or the interior of the hanger, and also to provide a novel manner of connecting a pair of cranks so that they will be normally held in a rigid interlocking engagement, but may be readily separated when necessary or desirable to facilitate their removal from the hanger.

In carrying out the objects of the invention generally stated above it will be understood, of course, that the essential features thereof, are necessarily susceptible of changes in details and structural arrangements, one preferred and practical embodiment of which is shown in the accompanying drawings, wherein:—

Figure 1 is a central vertical sectional view of the improved hanger, showing the interlocked cranks mounted therein. Fig. 2 is a vertical sectional view taken on the line 2—2, Fig. 1. Fig. 3 is a similar view taken on the line 3—3, Fig. 1.

Referring to said drawing by numerals, 1 designates the usual cylindrical crank hanger of a bicycle frame into which the bearing cups 2—3 are fitted from opposite ends, the meeting ends of said cups being overlapped and in threaded engagement, as indicated at 4 and detachably fastened together by the screws 5.

Crank 6 has a hollow angular shaft section 7 that is externally threaded, the interior of said section being hexagonal. Adjacent the junction of said section with the crank, the interior thereof tapers as indicated at 8 and terminates in an enlarged nut chamber 9. The hollow shaft section 7 of crank 6 is adapted to be placed within the cups 2—3 and its threaded exterior at the inner end thereof is provided with a cone seat 10 for a cone 11 between which and the cup 3 a series of anti-friction balls 12 are interposed. An internally threaded sleeve 13 holds cone 11 to its seat 10. An internally threaded cone 14 is adapted to be fitted over the free end of the shaft section 7 of crank 6, said cone being provided with annular flange 15 that overlaps the said free end. Said flange has an opening through its center that is of the same diameter as the interior of hollow shaft section 7, the edge of said opening being provided with regularly spaced apart and preferably substantially V-shaped grooves 16.

Crank 17 has its angular shaft section 18 of such a size that it will fit within hollow section 7, said section 18 being hexagonal and having a tapering portion 19 that terminates in a threaded end 20. Said threaded end 20 projects into nut chamber 9 and is adapted to be engaged by the tubular nut 21 that is fitted within said chamber 9 so that the angular shaft section of crank 17 may be rigidly held in interlocking engagement with the hollow section 7 of crank 6.

The hexagonal shaft section 18 of crank 17, adjacent its junction with said crank, has each of its flat surfaces provided with a substantially V-shaped longitudinally arranged lug 21, said lugs having an interlocking engagement with the grooves 16 of flange 15 when the parts of the invention are assembled.

It will be understood from the foregoing, that the cranks are held in rigid relation when assembled but that they may be readily released to permit separation thereof, or to permit the cranks to be adjusted relative to each other. And it will also be seen that through the described manner of connecting the parts of the invention, foreign matter cannot gain access to the interior thereof, and that said parts may be readily disassembled when desired.

What I claim as my invention is:—

1. In a device of the character described the combination with a hanger, of a pair of cranks each provided with an angular shaft section adapted to enter said hanger from opposite ends, one of said sections being hollow and externally threaded and provided with a cone seat, a cone for said seat, a sleeve having a threaded engagement with said section for holding said cone to its seat, a threaded end cone surrounding and overlapping the free end of said section, said end cone having a flange that is provided with grooves, anti-friction bearings interposed between said cones and said hanger, the other shaft section being adapted to telescope with said hollow shaft section, means for fastening said sections in telescoping relation, and lugs carried by the inclosed section for engagement with the grooves of the flanged cone.

2. In a device of the character described, the combination with the hanger, of a crank having a hollow shaft extension journaled therein, a cone carried by the free end of said section, said cone provided with a flange, said flange provided with grooves, and a second crank provided with a shaft section adapted for telescopic engagement with said hollow shaft section, said second-mentioned shaft section provided with lugs for interlocking engagement with the grooved flange of said cone.

In testimony whereof I hereunto affix my signature in presence of two witnesses.

TIMOTHY REYNOLDS.

Witnesses:
C. T. GRANT,
E. S. REICHARD.